(No Model.)

W. CRAIG.
STOP VALVE.

No. 597,141. Patented Jan. 11, 1898.

Witnesses:
M. E. Fletcher.
Fred Hayner

Inventor.
William Craig
by attorneys.
Briesen & Knauth

THE NORRIS PETERS CO., PHOTO-LITHO., WASHINGTON, D. C.

UNITED STATES PATENT OFFICE.

WILLIAM CRAIG, OF BROOKLYN, NEW YORK.

STOP-VALVE.

SPECIFICATION forming part of Letters Patent No. 597,141, dated January 11, 1898.

Application filed March 26, 1897. Serial No. 629,351. (No model.)

*To all whom it may concern:*

Be it known that I, WILLIAM CRAIG, of the city of Brooklyn, in the county of Kings and State of New York, have invented a new and useful Improvement in Stop-Valves, of which the following is a specification.

This invention relates to stop-valves of the puppet kind; and it consists in the novel means hereinafter described and claimed whereby the opening and closing of a valve of the largest size controlling fluids of the highest pressures may be effected very easily and under the most perfect control by the manipulation of two small valves and whereby also such a valve is caused to close automatically but slowly in case of the bursting, at any point beyond the valve, of the pipe the opening and closing of which the valve is intended to control.

Figure 1:
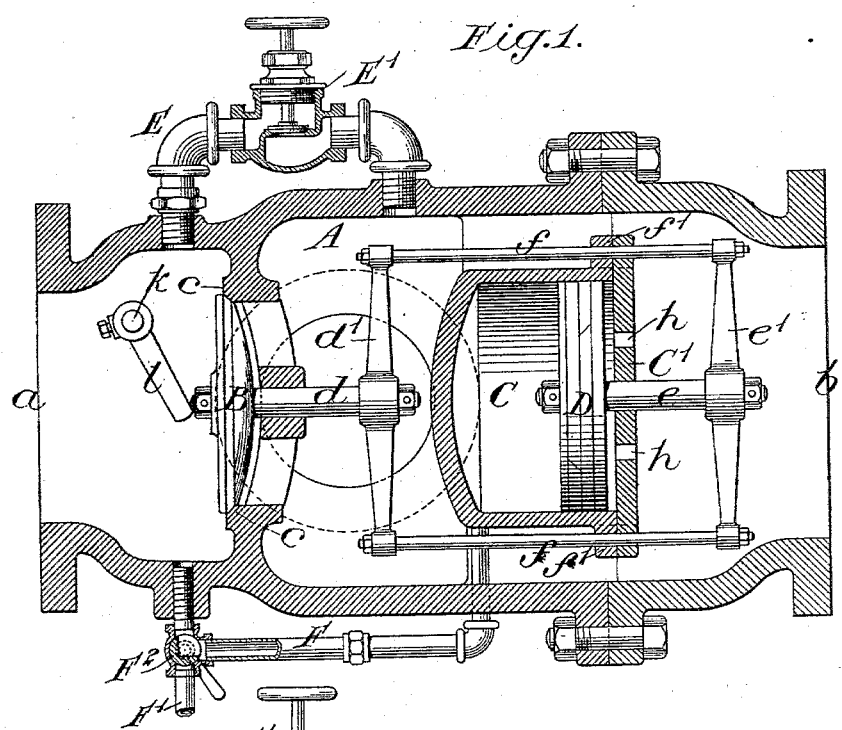
Figure 2:
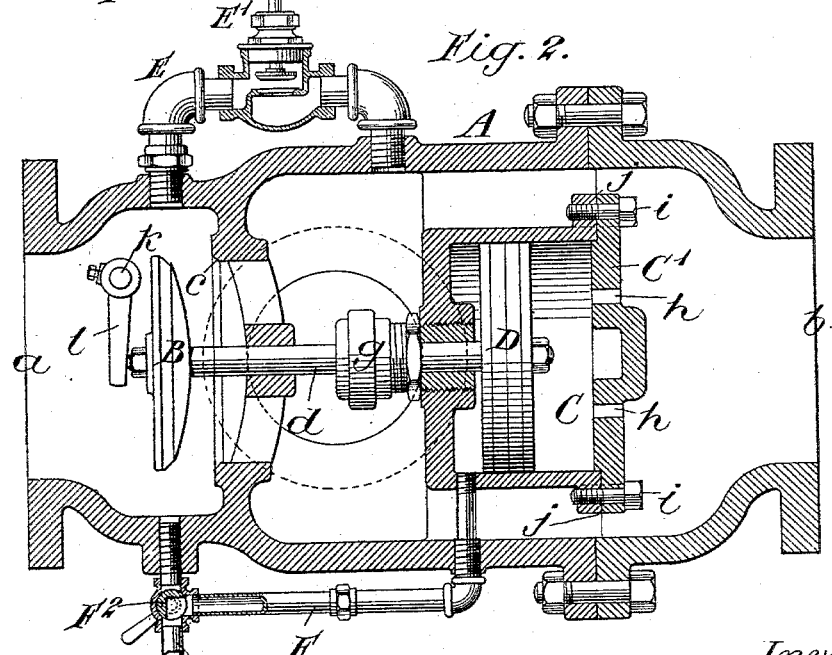

Figures 1 and 2 represent central sections of two different examples of a valve and its accessories embodying my invention.

In both figures, A designates the valve-casing, having an inlet $a$ at one end and an outlet $b$ at the other end and having a seat $c$ for the valve B near its inlet end and directly between the inlet and outlet. Between the valve-seat $c$ and the outlet end $b$ of the casing A there is centrally located, within the casing and concentric with the valve-seat, a stationary cylinder C, the bore of which is a little larger than the circumference of the outer edge of the bevel of the valve B and seat $c$. To this cylinder, which may be called the "power-cylinder," is fitted a piston D, which is connected positively with the stem $d$ of the valve.

In Fig. 1 the connection of the piston with the stem is made by providing the piston with a rod $e$, which passes through the front head C' of the cylinder C, providing the valve-stem with a cross-head $b'$ and the piston-rod $e$ with a cross-head $e'$ and connecting the cross-heads by side rods $f$ at the sides of the said cylinder, the said cross-head and side rods forming a yoke. The side rods $f$ are represented as running through lugs $f'$ on the cylinder C and its head C', and thereby made to serve as guides to the piston and valve. This mode of connecting the valve and piston dispenses with a stuffing-box between them.

In the example shown in Fig. 2 the piston D is connected directly with the valve-stem $d$, which passes through a stuffing-box $g$ in the rear end of the cylinder.

In Fig. 1 the rear end of the cylinder is perfectly closed, and in Fig. 2 it is closed except for the stuffing-box, and is therefore practically closed.

In Fig. 1 the piston-rod $e$ passes loosely through an opening provided for it in the head or front end C' of the cylinder, and other small openings $h$ are provided in the cylinder-head for the purpose hereinafter described. In Fig. 2 there are similar openings $h$ provided in the cylinder-head C'. In both examples there is ample room between the exterior of the cylinder C and the interior of the casing A for a free current of steam or other fluid or liquid to be controlled by the valve. The connection of the head C' with the cylinder C by the bolts $i$ is preferably made through lugs $j$ and not through flanges, the lugs not interfering materially with the current.

E is a by-pass consisting of a small pipe forming communication between the portion of the casing on opposite sides of the valve-seat $c$ and furnished with a small hand-controlled stop-valve E'. F is another by-pass consisting of a small pipe forming communication between the portion of the casing behind the valve-seat $c$ and the portion of the cylinder C behind the piston D. From this pipe F there branches off at F' a drip pipe or vent to the atmosphere, and at the junction between the said pipe F and the drip-pipe there is a hand-controlled three-way cock F², by which communication may be formed, as shown in Fig. 1, directly through said pipe from behind the valve-seat to the back of the piston while the drip pipe or vent F' is closed, or by which communication may be formed, as shown in Fig. 2, between the rear end or the cylinder C and the drip pipe or vent while the communication with the casing behind the valve-seat is closed. The three-way cock remains in the latter condition at all times but when it is required to close the valve B. The valve E' in the by-pass E remains closed at all times but when it is desired to open the valve B.

The operation is as follows: When steam, water, or other fluid under pressure is first admitted to the casing at E, the valve B will be closed or kept closed by the pressure upon it. When it is desired to open the valve B, all that it is necessary to do is to open the by-pass valve E', as shown in Fig. 2. The fluid will then flow from the back to the front of the valve until there is pressure on the front side of the piston D. Then by reason of the greater area of the piston as compared with that of the valve and of the rear end of the power-cylinder C being open to the atmosphere by the pipes F F' the valve B will be opened, as shown in Fig. 2. This opening will take place gradually and smoothly by reason of the smallness of the openings $h$ for the entrance of the fluid into the power-cylinder C. After the valve B has been opened the by-pass valve E' may be closed, as the pressure in front of the power-piston D will hold the valve open. When it is desired to close the valve, the three-way cock $F^2$ is turned to the position shown in Fig. 1, and the fluid under pressure, passing into the rear end of the power-cylinder, neutralizes sufficiently the preponderance of the area of the power-piston over that of the valve B, and the valve will be moved gradually and smoothly to its seat by the pressure behind it, all tendency to shock being obviated by the smallness of the openings $h$ in the cylinder-head C', through which the fluid in front of the piston has to escape, the fluid in the portion of the cylinder in front of the piston thus acting as a cushion.

In case of the bursting of the casing or of the pipe connected therewith at any point on the outlet side of the valve B the said valve will close automatically by the pressure behind it, but this closing will be rendered gradual by the cushioning action of the piston hereinbefore described.

There is represented in both figures the spindle $k$ of an index, which is located outside of the valve-casing, and it is furnished with an arm $l$, against which the valve acts to show by the index whether it is open or closed, but this is immaterial to my invention.

What I claim as my invention is—

1. The combination of a valve-casing, a puppet-valve and a seat therefor within said casing, a power-cylinder having an area larger than said valve located within said casing between the valve and the outlet, the end of said cylinder next the valve being provided with a vent to the atmosphere but being closed to the casing and the other end of said cylinder being open to the casing, a piston in said cylinder, a connection between said piston and said valve, a by-pass forming communication between the portions of the casing on opposite sides of the valve-seat, and means for closing said by-pass and for opening it for the admission of fluid from the inlet side of the valve-seat to the outlet side thereof and to the open end of the cylinder for opening the valve, substantially as herein described.

2. The combination of a valve-casing, a puppet-valve and a seat therefor within said casing, a power-cylinder located within said casing between the valve and the outlet, the end of said cylinder next the valve being closed to the casing and the other end being open thereto, a piston in said cylinder, a connection between said piston and said valve, a by-pass forming communication between the portion of the casing on the inlet side of the valve and the said closed end of the power-cylinder and means for closing said by-pass and opening it for the introduction of fluid from the inlet side of the valve to said cylinder for closing the valve, substantially as herein described.

3. The combination of a valve-casing, a puppet-valve and a seat therefor within said casing, a power-cylinder and piston located within said casing between the valve and the outlet, the end of said cylinder next the valve being closed to the casing and the other end having contracted openings to the casing for the cushioning of the fluid between it and the piston, a connection between said piston and valve, a by-pass forming communication between the portion of the casing on the inlet side of the valve and the so-closed end of the power-cylinder, and means for closing and opening said by-pass, all substantially as herein described.

4. The combination of a valve-casing, a puppet-valve and a seat therefor in said casing, a power-cylinder and piston of larger area than the valve located within the casing on the outlet side of the valve-seat with their axis in the same direction with that of the valve, two by-passes leading from that part of the casing on the inlet side of the valve to opposite ends of said cylinder respectively and means for separately controlling said by-passes for admitting fluid to either end of said cylinder as required for opening and closing the valve, substantially as herein described.

5. The combination of a valve-casing, a puppet-valve and a seat therefor in said casing, a power-cylinder and piston located within said casing between the valve and the outlet and having a larger area than the valve, the said cylinder being closed to the casing at the end next the valve but open thereto at the other end, a by-pass and means for opening and closing the same between the portions of the casing on opposite sides of the valve-seat, a second by-pass between that part of the casing on the inlet side of the valve-seat and the so-closed end of the cylinder, a vent or drip outlet from said second by-pass and a three-way cock for opening and closing said by-pass to the casing and to the vent or drip outlet respectively, all substantially as and for the purpose herein described.

6. The combination of a valve-casing, a puppet-valve and a seat therefor in said casing, a power-cylinder located in said casing between the valve-seat and the outlet, the end of said cylinder next the valve being closed to the casing and its other end open thereto, a rod connected with the piston and passing through the so-open end of the cylinder and a yoke connection within the casing between the piston-rod and the valve-stem, substantially as herein described.

WILLIAM CRAIG.

Witnesses:
   FREDK. HAYNES,
   LIDA M. EGBERT.